United States Patent [19]

Inuiya

[11] 3,917,955

[45] Nov. 4, 1975

[54] COORDINATE DETECTING APPARATUS FOR USE WITH OPTICAL PROJECTING APPARATUS

[75] Inventor: Masafumi Inuiya, Asaka, Japan

[73] Assignee: Fuji Photo Film Co., Ltd., Minami-ashigara, Japan

[22] Filed: Sept. 6, 1974

[21] Appl. No.: 503,568

[30] Foreign Application Priority Data

Sept. 6, 1973 Japan .............................. 48-100592

[52] U.S. Cl. ................ 250/549; 250/216; 250/578; 340/324 A; 178/DIG. 2

[51] Int. Cl.$^2$ ............................................ G01J 1/20

[58] Field of Search ......... 250/237 G, 203 CT, 216, 250/227, 578, 556, 549; 178/18–20, DIG. 2, 178/6.8; 340/324 A, 324 R, 173 LM; 353/24, 25

[56] References Cited

UNITED STATES PATENTS

| | | | |
|---|---|---|---|
| 3,175,089 | 3/1965 | Talley et al. | 250/203 CT |
| 3,292,489 | 12/1966 | Johnson et al. | 353/25 |
| 3,328,793 | 6/1967 | McLaughlin et al. | 178/DIG. 2 |
| 3,534,359 | 10/1970 | Harris | 340/324 A |
| 3,651,508 | 3/1972 | Scarborough, Jr. et al. | 250/549 X |
| 3,829,614 | 8/1974 | Ahlbom et al. | 250/203 CT |

*Primary Examiner*—Walter Stolwein
*Attorney, Agent, or Firm*—Sughrue, Rothwell, Mion, Zinn & Macpeak

[57] ABSTRACT

A coordinate detecting apparatus for use with an optical projecting apparatus, which includes an illuminating light source for projecting an optically recorded medium, an illuminating optical system, a recorded-medium support member, a projecting optical system and a screen, the coordinate detecting apparatus comprising light spot generating means including a cathode-ray tube for generating the light spot to scan the screen on which an optical picture image is projected in a composed manner, a deflecting circuit and a composite projecting optical system for generating a light spot and for projecting the same on the screen, photoelectric detecting means for detecting the light spot on the screen, and coordinate position detecting means responsive both to the photoelectric detected output signal of the photoelectric detecting means and to the deflecting signal of the light spot generating means for detecting the coordinate position of the photoelectric detecting means on the screen.

4 Claims, 5 Drawing Figures

COORDINATE DETECTING APPARATUS FOR USE WITH OPTICAL PROJECTING APPARATUS

BACKGROUND OF THE INVENTION

1. Field of the Invention

The present invention relates to a coordinate detecting apparatus for use with an optical projecting apparatus, and, more particularly, to a coordinate detecting apparatus capable of converting into a coordinate-position indicating output signal the desired information portion of a picture image, which is projected by the optical projecting apparatus on a screen, which is selectively indicated by an observer using a photoelectric detector such as a light pen.

2. Description of the Prior Art

An optical projecting apparatus is known as an apparatus for projecting on an enlarged scale on a screen a portion of a picture image, which is recorded on an optical recording medium, for example, on a film or a sheet, (herein the picture image will hereinafter to be referred to, for brevity, as a recorded picture image), which is desirably selected by an observer, for easy observation of the recorded picture image. By combining such an optical projecting apparatus with an information processing system such as an electronic computer, the recorded picture image can be automatically located under the control of the information processing system of the picture image, which is projected on the screen, is partially introduced as input information into the information processing system. When, in this instance, the information portion of the picture image is to be introduced into the information processing system, the current practice is to observe the picture image on the screen, to read out numerals or symbols which are representative of the desired portion of the picture image, and then to introduce those numerals or symbols into the information processing system through a keyboard which is attached to the optical projecting apparatus. If, however, it were possible to accomplish the input of the desired optical information using a indicator such as a light pen, which is handled directly manually over the screen, then several marked advantages in actual use of the optical projecting apparatus would result, including a shortening of the time period required for accomplishing the input of the information, enhanced reliability in such accomplishment, reduced fatigue of the operator, and the like.

In the optical projecting apparatus, when it is necessary to directly feed a portion of the information of the projected picture image from the screen to the electronic computer, one known method is to overlay the screen with a Rand tablet or an ultrasonic tablet, which is in itself a coordinate-value input pattern device, or to use a screen which is sensitive to the touch of the operator. Since the tablet to be used in either of the methods is complicated, the screen itself accordingly becomes more expensive when in an enlarged scale and the tablet adversely affects the observation of the picture image on the screen.

SUMMARY OF THE INVENTION

It is, therefore, an object of the present invention to provide a coordinate detecting apparatus for use with an optical projecting apparatus of a conventional type.

Another object of the present invention is to provide a coordinate detecting apparatus of the above type, which can detect a coordinate position in a picture image projected on a screen which is indicated by a light pen or the like, at a reasonable production cost even when the screen is enlarged and at the same time without adversely affecting the observation of the picture image on the screen.

According to a major aspect of the present invention, a coordinate detecting apparatus for use with an optical projecting apparatus is provided, which includes an illuminating light source for projecting a recorded picture image, an illuminating optical system, a support member for the recorded picture image, a projecting optical system and a projecting screen. The coordinate detecting apparatus comprises: a cathode-ray tube for generating a light spot; a light spot projecting optical system for projecting the light spot on the projecting screen concurrently with and in a superimposed manner on the projected image of the recorded picture image; a photoelectric detecting means for detecting the light spot on the screen; and an electric circuit responsive to the phase relationship between the light spot signal from the light pen and a deflecting signal, which is operative to scan the screen using the light spot, for detecting the coordinate position values of the detected light spot, whereby the coordinate position values of such a portion of information of the projected picture image, as is indicated by the light pen, can be detected without being adversely affected by the size of the screen and without detrimentally influencing the observation of the projected picture image.

BRIEF DESCRIPTION OF THE DRAWINGS

These and other objects and advantages of the present invention will become apparent from the following descriptions taken in conjunction with the accompanying drawings.

DESCRIPTION OF A PREFERRED EMBODIMENT

A coordinate detecting apparatus of the present invention for use with an optically projecting apparatus is described in conjunction with the case in which it is applied to an automatic locating micro-reader.

Figures 1, 3:
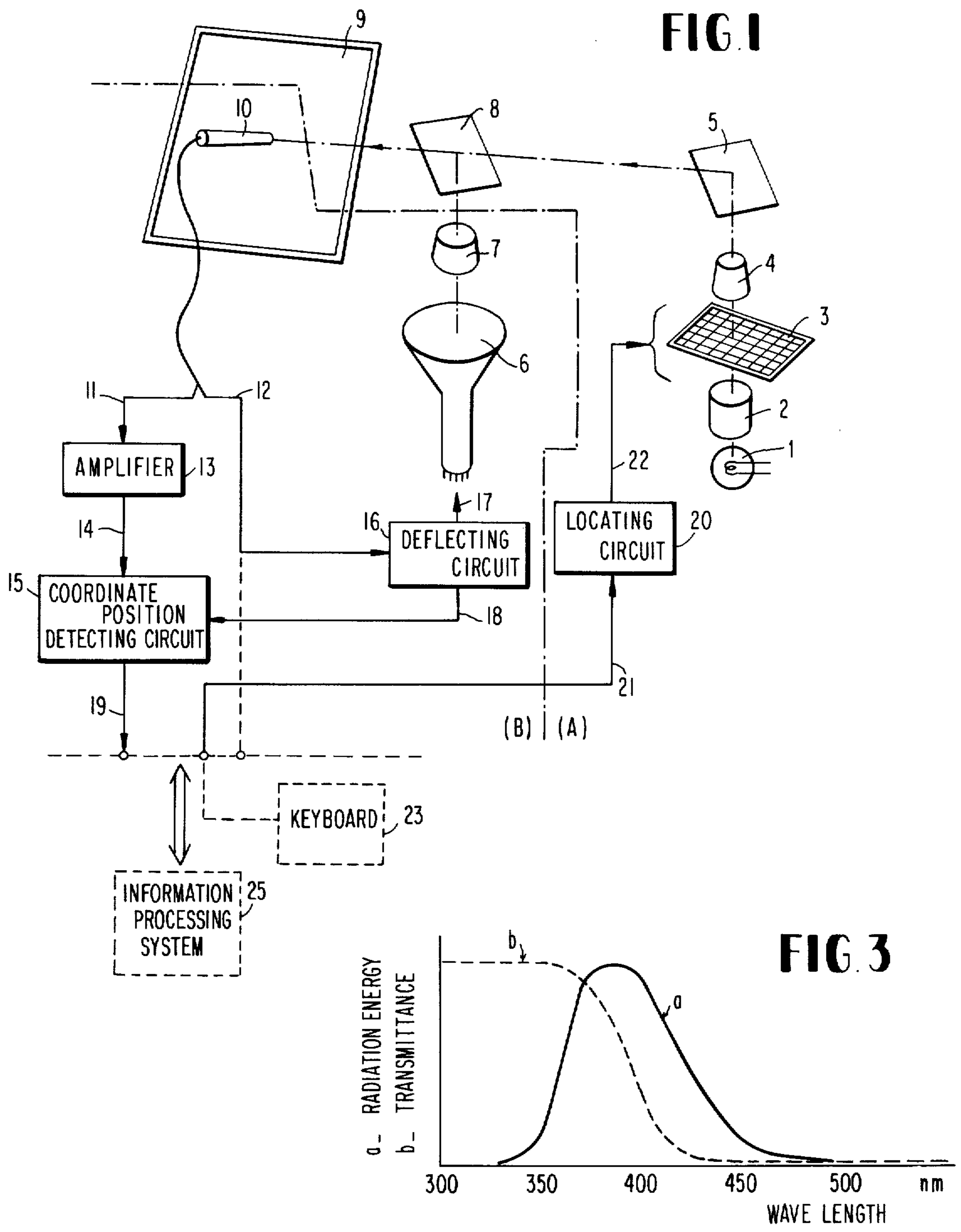
FIG. 1 is a block diagram showing a coordinate detecting apparatus of the present invention for use with an optical projecting apparatus.
FIG. 3 is a graphical presentation showing both an emission spectroscopic distribution of a P - 16 fluorescent substance, which is used as an example in a cathode-ray tube, and a spectroscopic distribution of an ultraviolet-light transmitting and visible-light absorptive filter which is used with the cathode-ray tube.

FIG. 1 is a block diagram showing a coordinate detecting apparatus according to the present invention, which is used to detect a coordinate position on a screen of an optical projecting apparatus. As shown, the block diagram is generally divided into an optically projecting system (A) and a coordinate detecting system (B). The optically projecting apparatus (A) functionally is no different from a conventional automatic locating microreader, and includes an illuminating light source 1, an illuminating optical system 2, a microfiche 3, a projecting lens 4, a reflecting mirror 5, a screen 9, and a locating circuit 20. The projecting apparatus (A) is responsive to a locating signal 21 of a keyboard 23 or an outside information processing system 25 such as an electronic computer so as to locate the desired information in the microfiche 3 to thereby project the located information on the screen 9.

On the other hand, the coordinate detecting system (B) is constructed to incorporate the coordinate detecting apparatus the present invention, and includes a cathode-ray tube 6 for generating a light spot with which the screen 9 is scanned, a deflecting circuit 16, a projecting lens 7 for projecting the light spot, which is generated on the face of the cathode-ray tube 6, on the screen 9, a half mirror 8 for composing the light spot and the projected image (which will be hereinafter referred to for brevity as a microprojected image) of the microfiche 3 on the screen 9, a photoelectric detecting means 10 light pen for detecting the light spot projected on the screen 9, an amplifier 13 for amplifying the light pen signal 11 supplied from the light pen 10, and a coordinate position detecting circuit 15 for comparing the light pen signal 14 thus amplified with a synchronizing signal 18 of the deflecting circuit 16 so as to detect the position on the screen 9 which is indicated by the light pen 10 to thereby generate a coordinate output signal.

The constituents of the coordinate detecting system (B) are described in greater detail in the following.

The cathode-ray tube 6 is controlled by a deflecting signal 17 or a deflecting circuit 16 to generate a light spot, which scans the face of the tube 6. If, a detection of the position of the scanning light on a rectangular coordinate with use of the light pen 10 is intended then the circuit construction of the coordinate position detecting circuit 15 is most simplified using the so-called "raster scanning method", in which the light spot is shifted vertically while the light spot is shifted linearly in the horizontal direction.

Figure 2:
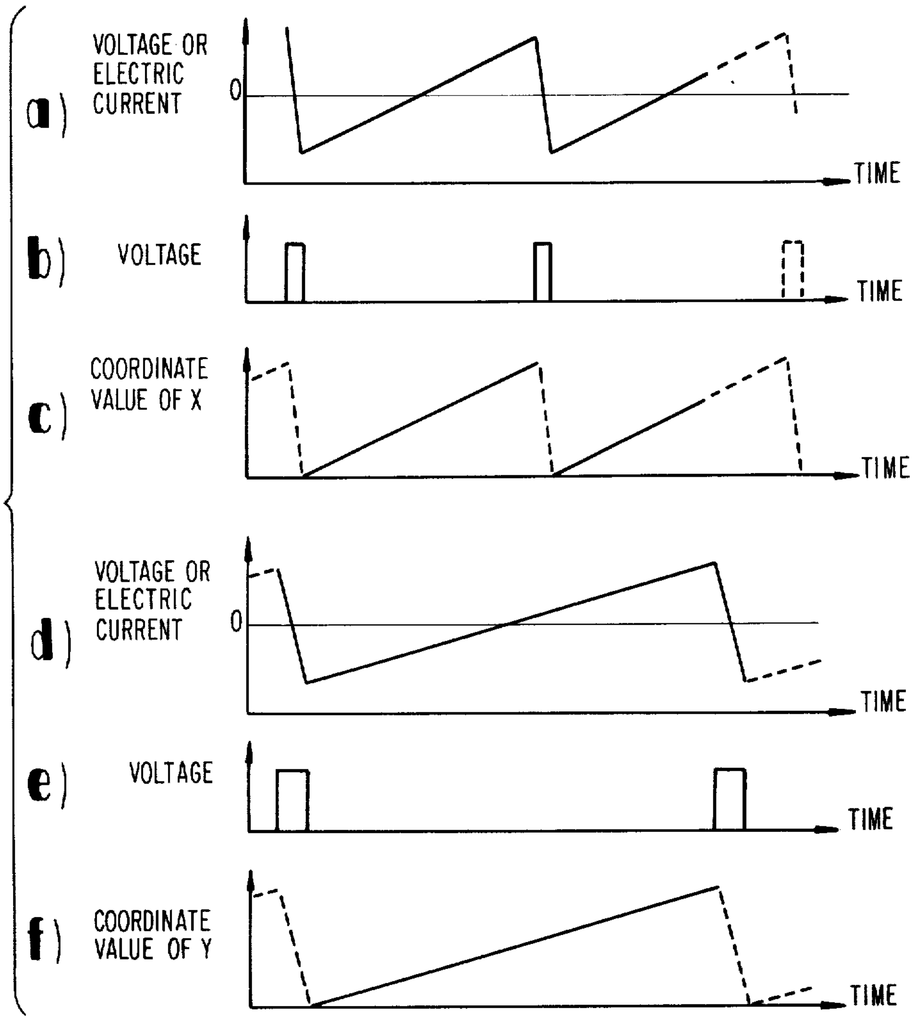
FIG. 2 is a graphical presentation showing the relationships among the deflecting signal of a deflecting circuit for a cathode-ray tube, a synchronizing signal and a coordinate position of a light spot.

If, in this instance, it is assumed that the cathode-ray tube 6 and the projecting lens 7 are ideally constructed to have no distortion, then the time relationships will become those, as shown in FIG. 2, between the deflecting signal 17 and the synchronizing signal 18 for controlling the scanning process of the light spot, which is produced by the cathode-ray tube 6 of the "raster scanning method", and the coordinate position values (X, Y) of the light spot, which is projected on the screen 9. In FIG. 2, graphs (a) and (b) show the wave forms of the horizontal deflecting signal and of the vertical deflecting signal, respectively, and the abscissa indicates the time period while the ordinate indicates the voltage level, for the case where the cathode-ray tube 6 is an electrostatic deflecting type, and the current level for the case where the cathode-ray tube 6 is an electromagnetic deflecting type. Graphs (b) and (e) of FIG. 2 show the horizontal synchronizing signal and the vertical synchronizing signal, respectively. When, in this instance, the position of the light spot projected on the screen 9 is expressed in rectangular coordinates (X, Y), then the X-axis value is in a linear relationship with the voltage or the current level of the horizontal deflecting signal, whereas the Y-axis value is in a linear relationship with the voltage or the current level of the vertical deflecting signal. On the other hand, graphs (c) and (f) of FIG. 2 denote in the X-axis value and the Y-axis value the positions of the light spot projected on the screen, respectively. In FIG. 2, moreover, graphs (a), (b) and (c) employ the same time axis and graphs (d), (e) and (f) employ the same time axis. Here, the scale of the same time axis of graphs (a), (b) and (c) is amaller than that of the time axis of graphs (d), (e) and (f) by the order of $10^{-2}$.

If, on the other hand, the light spot generated by the cathode-ray tube 6 is composed with the micro-projected image on the screen 9, the particular light spot will hinder the observation of the micro-projected image by the operator of the micro-reader. One embodiment for eliminating this difficulty is for the spectral distribution of the light spot coming from the cathode-ray tube 6 to have an invisible wave length range, that is, a wavelength less than about 380 nm (nonometers) or more than about 760 nm. In a preferred embodiment, the spectral distribution of the light spot, which is focussed on the screen 9 through a projecting lens after it is generated by a cathode-ray tube using a P - 16 fluorescent substance, is shown by a curve *a* of FIG. 3 to range generally from a wave length of about 330 to 480 nm. If a cathode-ray tube having the P - 16 fluorescent substance is used with an ultraviolet light transmitting and visible-ray absorptive filter which has a spectral distribution as shown by curve *b* of FIG. 3, then a light spot having a wave length ranging from about 330 nm to 400 nm can be formed on the screen. The light spot thus obtained is substantially invisible to the human eye so that observation is hardly disturbed. Since, moreover, the wave length of the light spot is sufficient to be sensed by a photoelectric element in the light pen 10, no problem in the detecting operation of the coordinate position by the light pen arises.

Another embodiment for eliminating the above difficulty is to hold the first grid of the cathode-ray tube 6 at such a small potential with respect to its cathode that the cathode-ray tube 6 is kept nonconductive (in other words, to keep the light spot extinguished). In this embodiment, when the operator of the micro-reader observes the micro-projected image on the screen 9 and indicates a desired portion with the light pen 10, then his pushing of the light pen 10 onto the screen will actuate a pushbutton switch in the light pen to generate a start signal 12. When this start signal 12 is produced, the first grid of the cathode-ray tube 6 is energized to have a higher potential than that of the cathode, during the time period while the screen 9 is subjected to one scanning operation by the light spot, so that the cathode-ray tube 6 is rendered conductive (that is to say, so that the light spot can be brought into an illuminating condition). During this one scanning time period, the light pen 10 detects the light spot to obtain the coordinate position values which are pointed out by the light pen 10. One scanning time period is about 1/60 of a second, and the scanning operation itself hardly disturbs the operator of the micro-reader. It should also be appreciated that this embodiment can provide an indication of the information which is directly read out from the micro-projected image.

In still another embodiment for eliminating the above difficulty, the output image signal of a character generator, which is connected to the outside information processing system such an electronic computer, is introduced into the cathode or the first grid of the cathode-ray tube 6 to display the characters or dots on the cathode-ray tube 6. These characters or dots are then projected on the screen 9 in a composed manner with the micro-projected image. If, in this embodiment, the characters or dots generated by the cathode-ray tube 6 are detected as the light spot by the light pen 10, the detection of the coordinate position values can be accomplished by the light pen. Moreover, the characters or dots, which are displayed on the cathode-ray tube 6, can be used not only as the light spot to be detected by the light pen 10 but also as variable information which cannot be indicated by the micro-projected image. In the latter application, the characters or dots can enhance, when they are projected in a composed fashion with the micro-projected image, the application value of the optical projecting apparatus, far from constituting a hindrance to the observation of the projecting apparatus.

Figure 4:
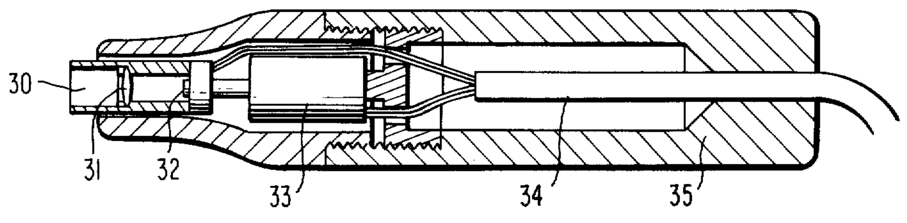
FIG. 4 is a longitudinal section showing a light pen which is used in the coordinate detecting apparatus of the present invention.

Turning now to FIG. 4, the light pen 10 includes a pen point 30, a focussing lens 31, a photoelectric element 32, a push button 33, an leading-out cord 34 and a casing cylinder 35. When the operator of the micro-reader observes the micro-projected image on the screen 9 and then indicates with use of the light pen 10 the desired information to be transmitted to the information processing system such as an electronic computer, the light spot, which is projected on the screen 9 after it has been generated by the cathode-ray tube 6, will go into the pen point 30, at the instant when it passes the field of view of the light pen 10, so as to be focussed by the focussing lens 31 on the light-receptive face of the photoelectric element 32. As a result, the light pen signal 11 is produced by the photoelectric element 32 and is transmitted into the amplifier 13 through the leading-out cord 34.

When, at the next stage, the operator of the micro-reader is going to actually transmit the information, which is pointed out by the light pen 10, to the information processing system 25 or the electronic computer, he can push the light pen 10 onto the screen 9. By this action, the pen point 30, the focussing lens 31 and the photoelectric element 32 of the light pen 10 are made to retract as a whole to render the push button switch 33, which is linked to those elements, conductive. As a result, the start signal 12 is generated by the push button switch 33, and is transmitted into the deflecting circuit 16 through the leading-out cord or directly into the outside computer 25 or the like.

The light pen signal 11 from the light pen 10 is amplified by the amplifier 13 and then is introduced into the coordinate position detecting circuit 15. Since, in this instance, the light pen signal 11 is produced only when the light spot passes the pen point 30 of the light pen 10, the light pen signal 11 can be made to have a pulse of a constant width T, if both the field of view of the light pen, which is determined by the light-receptive faces of the pen point 30, the focussing lens 31 and the photoelectric element 32 of the light pen 10, and the passing velocity of the light spot are held constant. If, therefore, a band amplifier, which can amplify pulses having a pulse width substantially equal to T, is used as the amplifier 13, then the ambient light (substantially of DC components), which might otherwise be introduced through the pen point 30 of the light pen 10, and the possible noise (substantially of high frequency components) can be eliminated, and only the signal coming from the light spot can be amplified to prevent malfunction of the light pen due to noise. In the coordinate position detecting circuit 15, therefore, the light pen signal 14 from the amplifier 13 and the synchronizing signal 18 of the deflecting circuit 16 of the cathode-ray tube 6 are compared with respect to their phase relationship to obtain the coordinate position values of the light pen 10 on the screen 9.

As shown in FIG. 2, proportional relationships are established among the deflecting signals (a) and (d) of the cathode-ray tube 6, the coordinate values (c) and (f) of the light spot on the screen 9, and the time elapsed widths after generation of the synchronizing signals (a) and (d) or the time elapsed widths after generation of the synchronizing signals (b) and (e) are obtained at the instant when the light pen signal 11 is generated, then the values thus obtained indicate the coordinate position values which are pointed out by the light pen 10 on the screen 9.

Figure 5:
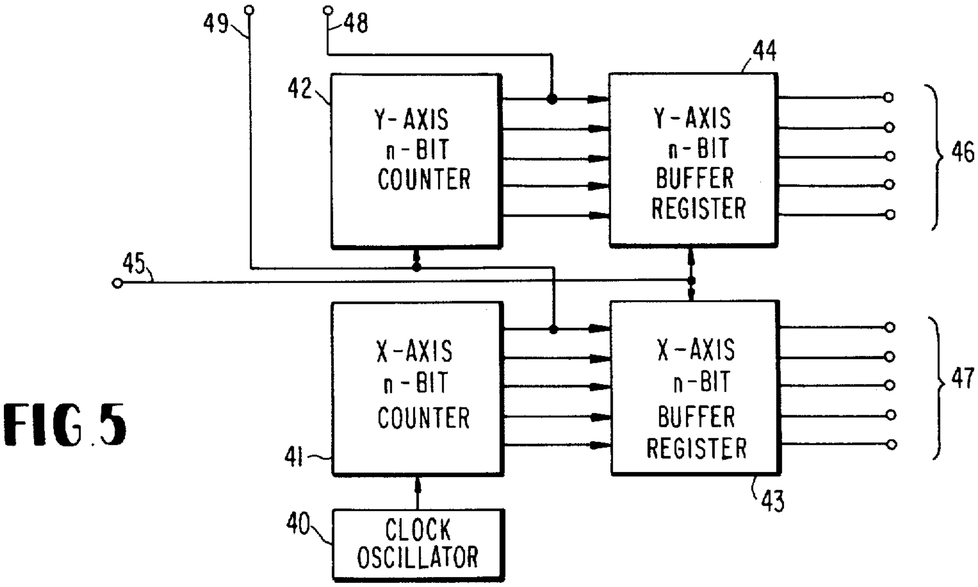
FIG. 5 is a block diagram showing a coordinate position detecting circuit which is used as an example in the coordinate detecting apparatus of the present invention.

Reference will now be made to FIG. 5, which shows one embodiment of the coordinate position detecting circuit according to the latter method, that is, for obtaining the time lapse width after the generation of the synchronizing signals. This detecting circuit is shown to include a clock oscillator 40, an X-axis n-bit counter 41, a Y-axis n-bit counter 42, an X-axis n-bit buffer register 43 and a Y-axis n-bit buffer register 44. The clock oscillator 40 is operative to generate clock pulses, which act as a reference for detecting the coordinate position. These clock pulses are then counted by the X-axis n-bit counter 41, in which a horizontal synchronizing signal 49 in the n-bit cycle is produced. Then, this horizontal synchronizing signal 49 is counted by the Y-axis n-bit counter 42, in which a vertical synchronizing signal 48 in the n-bit cycle is produced. If the horizontal synchronizing signal 49 and the vertical synchronizing signal 48 are used as the synchronizing signal 18 for the deflecting signal 17 of the cathode-ray tube 6 as shown in FIG. 1, the momentary coordinate position values of the light spot on the screen 9 are indicated by the output levels of the X-axis n-bit counter 41 and the Y-axis n-bit counter 42.

Thus, the light pen signal 11 is used, when generated, as a transfer pulse for the buffer register, and the output conditions of the X-axis n-bit counter 41 and the Y-axis n-bit counter 42 are transferred to the X-axis n-bit buffer register 43 and the Y-axis n-bit buffer register 44, respectively. Then, the outputs 47 of the X-axis n-bit buffer register 43 and the outputs 46 of the Y-axis n-bit buffer register 44 will indicate the coordinate position values, which were indicated by the light pen 10, as the digital quantities of $2^n \times 2^n$ sample points. These outputs 47 and 46 of the n-bit buffer registers 43 and 44 are then transferred to the outside information processing system 25 or an electronic computer as the desired coordinate position values 19 indicated by the light pen.

When the coordinate position values 19 are supplied to the information processing system 25, a subsequent information processing step is carried out on the basis of the information supplied. The subsequent step includes, for example, transfer of a locating signal 21, which has information corresponding to the supplied information for dictating one frame of a new microfiche to the micro-reader, or accomplishment of a calculation on the basis of the supplied information.

As has been described in the foregoing, according to the present invention, a portion of the information of the projected image can be transferred to an information processing system such as an electronic computer from a screen of an optical projecting apparatus using a light pen. Thus, the optical projecting apparatus can be used especially advantageously as a so-called "man-machine" system under the control of such an information processing system.

According to the present invention, it can be appreciated that the coordinate position of a projected image can be detected inexpensively.

It can also be appreciated that the detection of the coordinate position of the projected image can be made using a simplified apparatus.

It can also be appreciated that the detection of the coordinate position of a projected image of a magnification as desired can be made.

While the invention has been described in detail and with reference to specific embodiments thereof, it will be apparent to one skilled in the art that various changes and modifications can be made therein without departing from the spirit and scope thereof.

What is claimed is:

1. A coordinate detecting apparatus for use with an optical projecting apparatus which includes an illuminating light source for projecting an optically recorded medium, an illuminating optical system, a recorded-medium support member, a projecting optical system and a screen, said coordinate detecting apparatus comprising:

light spot generating means including a cathode-ray tube for generating a light spot to scan the screen on which an optical picture image is projected in a composed manner, a deflecting circuit and a composite projecting optical system;

photoelectric detecting means for detecting the light spot on the screen; and coordinate position detecting means responsive both to the photoelectrically detected output signal of said photoelectric detecting means and to the deflecting signal of said cathode-ray tube for detecting the coordinate position of said photoelectric detecting means on the screen.

2. The coordinate detecting apparatus of claim 1, wherein the composite projecting optical system includes a projecting lens for projecting the light spot onto the screen, and a half mirror for composing the light spot and the projected image of the recorded-medium.

3. The coordinate detecting apparatus of claim 1, wherein said light spot has a wave length less than about 380 nm or greater than about 760 nm.

4. The coordinate detecting apparatus of claim 1, wherein said photoelectric detecting means includes means for activating said light spot generating means when said photoelectric detecting means is actuated.

* * * * *